(12) United States Patent
Nawata

(10) Patent No.: US 6,915,106 B2
(45) Date of Patent: Jul. 5, 2005

(54) SYSTEM AND METHOD FOR DIGITAL SATELLITE COMMUNICATION

(75) Inventor: Hizuru Nawata, Tokyo (JP)

(73) Assignee: NEC Corporation, Tokyo (JP)

(*) Notice: Subject to any disclaimer, the term of this patent is extended or adjusted under 35 U.S.C. 154(b) by 518 days.

(21) Appl. No.: 09/994,852

(22) Filed: Nov. 28, 2001

(65) Prior Publication Data

US 2002/0065038 A1 May 30, 2002

(30) Foreign Application Priority Data

Nov. 28, 2000 (JP) ........................................ 2000-361888

(51) Int. Cl.$^7$ ................................................ H04K 3/00
(52) U.S. Cl. ..................................... 455/3.02; 725/131
(58) Field of Search ................................ 713/712, 715, 713/718; 455/3.06, 3.02, 3.03, 12.1, 427, 13.2; 725/132, 131, 140, 152, 68, 70

(56) References Cited

U.S. PATENT DOCUMENTS

| 5,666,293 | A | | 9/1997 | Metz et al. |
| 5,872,810 | A | | 2/1999 | Philips et al. |
| 5,930,515 | A | | 7/1999 | Ducharme et al. |
| 5,930,704 | A | | 7/1999 | Kay |
| 6,148,215 | A | * | 11/2000 | Doi et al. ................ 455/552.1 |
| 6,587,443 | B1 | * | 7/2003 | Dutta ......................... 370/322 |
| 2004/0073945 | A1 | * | 4/2004 | Yuzawa ...................... 725/132 |

FOREIGN PATENT DOCUMENTS

| JP | 5-158703 | 6/1993 |
| JP | 05158703 | 6/1993 |
| JP | 8-186875 | 7/1996 |
| JP | 11-298550 | 10/1999 |
| JP | 11-346186 | 12/1999 |
| JP | 2000-23251 | 1/2000 |
| JP | 2000-54953 | 2/2000 |
| JP | 2000-244358 | 9/2000 |
| JP | 2000-308135 | 11/2000 |
| JP | 2000-324043 | 11/2000 |
| JP | 2002-517121 | 6/2002 |
| WO | 99/23820 | 5/1999 |

* cited by examiner

*Primary Examiner*—Nay Maung
*Assistant Examiner*—Tu X Nguyen
(74) *Attorney, Agent, or Firm*—Young & Thompson

(57) ABSTRACT

In a digital satellite communications system for communicating data between a HUB station and a plurality of VSATs (Very Small Aperture Terminals) or between the VSATs via a communications satellite, each VSAT comprises: a digital signal processing section for demodulating signals received by the VSAT; ROM for storing a default program for letting the digital signal processing section execute signal demodulation at start-up of the VSAT; rewritable memory for storing an operation program for letting the digital signal processing section execute signal demodulation after the start-up of the VSAT; an operation program download section for obtaining the operation program by downloading the operation program from the HUB station; an error check/rewriting section for conducting error check to the downloaded operation program until an errorless operation program is obtained by the download and storing the errorless operation program in the rewritable memory; and a switching control section for switching a program which is loaded into and used by the digital signal processing section from the default program to the operation program.

15 Claims, 4 Drawing Sheets

SYSTEM AND METHOD FOR DIGITAL SATELLITE COMMUNICATION

BACKGROUND OF THE INVENTION

The present invention relates to a digital satellite communications system and a digital satellite communications method for communicating data between a central station (HUB station) and a plurality of VSATs (Very Small Aperture Terminals) or between VSATs via a telecommunications satellite, and in particular, to a digital satellite communications system and a digital satellite communications method capable of downloading (transmitting, broadcasting) a program from a HUB station to the VSATs.

DESCRIPTION OF THE RELATED ART

A digital satellite communications system generally includes a central station which is called "HUB station", a plurality of VSATs (Very Small Aperture Terminals), and a communications satellite as a repeater. Communication between the HUB station and the VSATs and communication between the VSATs are carried out via the communications satellite repeater. An outbound channel of a common channel (which is called "CSC" (Common Signaling Channel)) between the HUB station and the VSATs is generally used for controlling and monitoring the VSATs.

Signal transmission via the CSC outbound channel is generally carried out by use of high power so as to attain high C/N (carrier wave power/ noise power) in order to improve reliability and ensure high operating ratio.

Traffic channels which are established between the VSATs are used for communicating digitally modulated signals such as burst signals (voice activation etc.), continuous signals for ordinary data communication, etc.

If alteration/addition of functions (such as alteration of signal transmission type (switching between burst signal reception and continuous signal reception), alteration of FEC (Forward Error Correction) algorithm, alteration of data transmission rate, etc.) became necessary in the traffic channel, alterations have to be made also to a program of a DSP (Digital Signal Processor) which executes digital modulation/demodulation of signals.

In the burst signal reception, signal demodulation has to be done correctly from the first bit of the received data, therefore, a specific demodulation sequence using training bits (called "preamble") for the demodulator is generally employed. Therefore, when the contents of the preamble is altered, alterations have to be made also to the demodulation sequence.

In the case of alteration of FEC algorithm, in addition to the need of alteration of FEC decoding algorithm, proper operation at lower C/N (carrier wave power/ noise power) is also required since better performance by the FEC algorithm alteration is expected. Therefore, the need of revising demodulation algorithm also arises in order to improve the performance of the digital demodulator.

The change of data transmission rate involves alteration of clock regeneration parameters (PLL constant, counter frequency division ratio, etc.).

Further, a DSP program (program used by the DSP for signal modulation/demodulation) sometimes includes minor bugs that do not affect the basic operation of the DSP, therefore, there are cases where modifications have to be made to the DSP program. For the modification of the DSP program, ROM (Read-Only Memory) that is used for the DSP of the digital demodulator has to be replaced. In a digital satellite communications system having hundreds or thousands of VSATs, such modification and replacement are difficult under constraints of limited time and cost.

The replacement of ROM also becomes necessary when the digital satellite communications system is upgraded (change of configuration/arrangement of the system, addition of functions, etc.), therefore, such upgrade requiring ROM replacement could not be done easily and quickly.

Such alteration, modification and upgrade by means of ROM replacement have to be done to all the VSATs of the digital satellite communications system, otherwise service to some of the VSATs is necessitated to be deteriorated unfairly.

Incidentally, signals transmitted by the HUB station to the VSATs via the communications satellite by use of the CSC outbound channels are usually protected so as to eliminate data transmission errors in the satellite channels, however, there are cases where the transmitted signals are not correctly received by the VSATs due to hardware failure, errors in the channels, etc.

In a technique disclosed in Japanese Patent Application Laid-Open No. HEI5-158703, network equipment is provided with EEPROM (Electrically Erasable Programmable Read-Only Memory) for download in addition to the ordinary ROM. A new program is downloaded and stored in the EEPROM and the network equipment is started up by use of the downloaded program. If failure occurred in the start-up, the failure is detected and the network equipment is restarted by use of a program which has preliminarily been stored in the ROM.

In the technique of the above document, the download is conducted in order to update a program of the CPU of the network equipment, therefore, a program of the demodulator (which characterizes transmission performance and transmission quality of the transmission channel which is used for the download) is not downloaded and updated.

As described above, in the conventional digital satellite communications systems, improvement of the characteristics and performance of the communication channels can not be expected since the program of the demodulator as the "engine" for carrying out communication is not downloaded and updated. In short, the conventional digital satellite communications systems involve the inconvenience of not capable of improving the quality of the "download" itself immediately and directly.

SUMMARY OF THE INVENTION

It is therefore the primary object of the present invention to provide a digital satellite communications system and a digital satellite communications method by which the communication between VSATs can be carried out by use of a downloaded errorless up-to-date program, without the need of ROM replacement and without the need of re-downloading the original program from the HUB station for restoring the version of the program to the original version even if the downloaded program for the demodulator (DSP) had errors or abnormality.

In accordance with a first aspect of the present invention, there is provided a digital satellite communications system for communicating data between a HUB station and a plurality of VSATs (Very Small Aperture Terminals) or between the VSATs via a communications satellite. In the digital satellite communications system, each VSAT comprises: a digital signal processing means for demodulating signals which are received by the VSAT; nonvolatile memory for storing a default program for letting the digital signal processing means execute signal demodulation at start-up of the VSAT; rewritable memory for storing an operation program for letting the digital signal processing means execute signal demodulation after the start-up of the VSAT; an operation program download means for obtaining the operation program by downloading the operation program from the HUB station; an error check/rewriting means for conducting error check to the operation program downloaded from the HUB station until an errorless operation program is obtained by the download and storing the errorless operation program in the rewritable memory; and a switching control means for switching a program which is loaded into and used by the digital signal processing means from the default program to the operation program.

By such composition of the digital satellite communications system, communication between VSATs (or communication between the HUB station and the VSATs) by use of the errorless operation program is made possible without the need of ROM replacement. Even if the downloaded operation program had abnormality, the VSAT is allowed to obtain the up-to-date program again by requesting the download of the operation program, without the need of starting up the VSAT again. The characteristics and performance of the communication channels can be improved quickly and easily by the download and update of the operation program of the demodulator as the "engine" for carrying out communication, thereby the quality of the "download" itself can be improved immediately and directly.

In accordance with a second aspect of the present invention, in the first aspect, the VSAT further comprises a reception logic means for detecting data reception from the HUB station at the start-up of the VSAT based on demodulating operation of the digital signal processing means. The switching control means executes the switching of the program from the default program to the operation program when the reception logic means detected the data reception from the HUB station. By such switching control, signal demodulation by use of the operation program can be started quickly and automatically.

In accordance with a third aspect of the present invention, in the first aspect, the switching control means switches the program which is loaded into and used by the digital signal processing means from the operation program to the default program when reception synchronization between VSATs can not be established. By such operation of the switching control means, the request for the download of the operation program can be made to the HUB station (by resetting the rewritable memory, by turning off the power of the VSAT and restarting the VSAT, for example) even if reception synchronization can not be established by use of the currently used operation program.

In accordance with a fourth aspect of the present invention, in the first aspect, the VSAT further includes a version comparison means. The version comparison means compares the version of an up-to-date operation program that can be downloaded from the HUB station with the version of the operation program which has been stored in the rewritable memory, and makes a request to the HUB station for the download of the up-to-date operation program so that the operation program will be replaced with the up-to-date operation program if the versions of the programs did not match. By the operation of the version comparison means, communication between the VSATs constantly using the up-to-date operation program is made possible.

In accordance with a fifth aspect of the present invention, in the fourth aspect, the version comparison means regularly conducts the version comparison between calls with other VSATs by referring to version data which is included in demodulated data which is obtained by demodulating signals transmitted from the HUB station, thereby the version of the operation program can be updated regularly and communication between the VSATs can be carried out using the operation program of the newest version constantly.

In accordance with a sixth aspect of the present invention, in the fourth aspect, the version comparison means is implemented by a CPU (Central Processing Unit), thereby the composition of the VSAT can be simplified.

In accordance with a seventh aspect of the present invention, in the first aspect, the operation program download means downloads the operation program from the HUB station via a CSC (Common Signaling Channel) outbound channel between the HUB station and the VSAT.

In accordance with an eighth aspect of the present invention, in the first aspect, the digital signal processing means is implemented by a digital demodulator.

In accordance with a ninth aspect of the present invention, in the eighth aspect, the digital signal processing means is implemented by a DSP (Digital Signal Processor).

By such composition, change of programs for alteration of signal transmission type (switching between burst signal reception and continuous signal reception), alteration of FEC (Forward Error Correction) algorithm, alteration of data transmission rate, etc. is made possible.

In accordance with a tenth aspect of the present invention, in the first aspect, the digital signal processing means is implemented by a digital demodulator having a clock regenerator, thereby change of programs for alteration of data transmission rate is made possible.

In accordance with an eleventh aspect of the present invention, in the first aspect, the nonvolatile memory and the rewritable memory are provided to the VSAT for the exclusive use of the digital signal processing means, thereby the digital signal processing means is allowed to operate at high processing speed.

In accordance with a twelfth aspect of the present invention, in the first aspect, the nonvolatile memory and the rewritable memory are shared by the digital signal processing means and other parts of the VSAT, thereby the composition of the VSAT can be simplified.

In accordance with a thirteenth aspect of the present invention, in the first aspect, the error check/rewriting means is implemented by a CPU (Central Processing Unit), thereby the composition of the VSAT can be simplified.

In accordance with a fourteenth aspect of the present invention, there is provided a digital satellite communications method for communicating data between a HUB station and a plurality of VSATs (Very Small Aperture Terminals) or between the VSATs via a communications satellite. The digital satellite communications method comprises a default program storage step, an initial signal reception step, an operation program download step, an error check/rewriting step, and a switching control step. In the default program storage step, a default program for letting a digital signal processing means of the VSAT execute signal demodulation at start-up of the VSAT is stored in nonvolatile memory of the VSAT. In the initial signal reception step, the VSAT receives signals from the HUB station and the digital signal processing means of the VSAT demodulates the received signals by use of the default program loaded from the nonvolatile memory at the start-up of the VSAT. In the operation program download step, an operation program for letting the digital signal processing means execute signal demodulation after the start-up of the VSAT is downloaded from the HUB station to the VSAT. In the error check/rewriting step, error check is conducted to the operation program downloaded from the HUB station until an errorless operation program is obtained by the download and the errorless operation program is stored in rewritable memory of the VSAT. In the switching control step, a program which is loaded into and used by the digital signal processing means is switched from the default program to the operation program. By the digital satellite communications method, communication between VSATs (or communication between the HUB station and the VSATs) by use of the errorless operation program is made possible without the need of ROM replacement. Even if the downloaded operation program had abnormality, the VSAT is allowed to obtain the up-to-date program again by requesting the download of the operation program, without the need of starting up the VSAT again. The characteristics and performance of the communication channels can be improved quickly and easily by the download and update of the operation program of the demodulator as the "engine" for carrying out communication, thereby the quality of the "download" itself can be improved immediately and directly.

In accordance with a fifteenth aspect of the present invention, in the fourteenth aspect, the switching of the program from the default program to the operation program is executed when data reception from the HUB station is detected based on demodulating operation of the digital signal processing means at the start-up of the VSAT, thereby signal demodulation by use of the operation program can be started quickly and automatically.

In accordance with a sixteenth aspect of the present invention, in the fourteenth aspect, the digital satellite communications method further comprises a second switching control step. In the second switching control step, the program which is loaded into and used by the digital signal processing means is switched from the operation program to the default program when reception synchronization between VSATs can not be established, thereby the request for the download of the operation program can be made to the HUB station (by resetting the rewritable memory, by turning off the power of the VSAT and restarting the VSAT, for example) even if reception synchronization can not be established by use of the currently used operation program.

In accordance with a seventeenth aspect of the present invention, in the fourteenth aspect, the digital satellite communications method further comprises a version comparison step. In the version comparison step, the version of an up-to-date operation program that can be downloaded from the HUB station is compared with the version of the operation program which has been stored in the rewritable memory and a request for the download of the up-to-date operation program is made to the HUB station so that the operation program will be replaced with the up-to-date operation program if the versions of the programs did not match, thereby communication between the VSATs constantly using the up-to-date operation program is made possible.

In accordance with an eighteenth aspect of the present invention, in the seventeenth aspect, the version comparison step is regularly conducted between calls with other VSATs by referring to version data which is included in demodulated data which is obtained by demodulating signals transmitted from the HUB station, thereby the version of the operation program can be updated regularly and communication between the VSATs can be carried out using the operation program of the newest version constantly.

In accordance with a nineteenth aspect of the present invention, in the fourteenth aspect, the download of the operation program in the operation program download step is executed via a CSC (Common Signaling Channel) outbound channel between the HUB station and the VSAT.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 1:
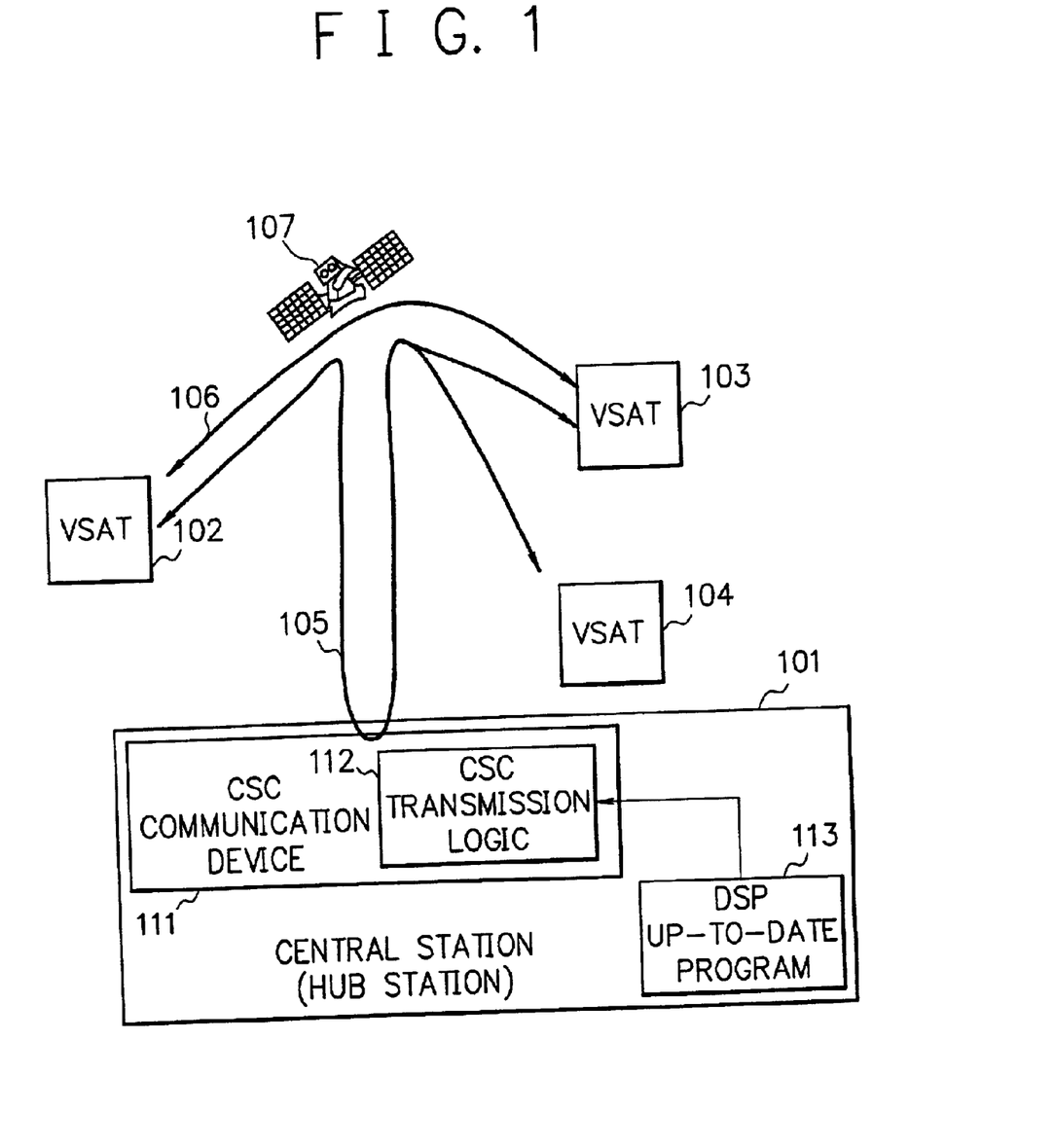
FIG. 1 is a schematic block diagram showing an example of a digital satellite communications system in accordance with an embodiment of the present invention.

FIG. 1 is a schematic block diagram showing an example of a digital satellite communications system in accordance with an embodiment of the present invention. The digital satellite communications system shown in FIG. 1 includes a central station (HUB station) 101, a plurality of VSATs (Very Small Aperture Terminals) 102, 103 and 104, and a communications satellite repeater 107.

Communication between the HUB station 101 and the VSATs (102, 103, 104) and communication between the VSATs are carried out via the communications satellite repeater 107 according to DAMA (Demand Assignment Multiple Access) with SCPC (Single-Channel Per Carrier) of FDMA (Frequency division multiple access).

The HUB station 101 is provided with a CSC (Common Signaling Channel) communication device 111. The CSC communication device 111 transmits control/monitoring signals to all the VSATs 102, 103 and 104 of the system via a CSC outbound channel 105 (outbound channel of a common channel which is called "CSC (Common Signaling Channel)") in broadcast mode, and thereby conducts control/monitoring of the entire system in a centralized manner.

When a call (a request for establishing a satellite link between VSATs) by one of the VSATs 102, 103 and 104 occurred, a called VSAT receives signals from the calling VSAT via a channel called "traffic channel" (traffic channel 106) which is established for the communication between VSATs.

The CSC communication device 111 of the HUB station 101 is provided with a CSC transmission logic 112. A DSP (Digital Signal Processor) up-to-date program 113 to be used by DSPs of digital demodulators 21 of the VSATs 102, 103 and 104 is installed in the CSC transmission logic 112, and the DSP up-to-date program 113 is downloaded (transmitted, broadcasted) to the VSATs 102, 103 and 104 by use of the CSC outbound channels 105.

The DSP up-to-date program 113 is a program of the latest version which is used for the operation of the DSPs 22 of the digital demodulators 21 of the VSATs 102, 103 and 104. An explanation on the DSP 22 will be given later. In the DSP up-to-date program 113 of the latest version, improved properties and functions newly added to the DSP 22 after the shipment and installation of the VSATs 102, 103 and 104 are incorporated.

Figure 2:
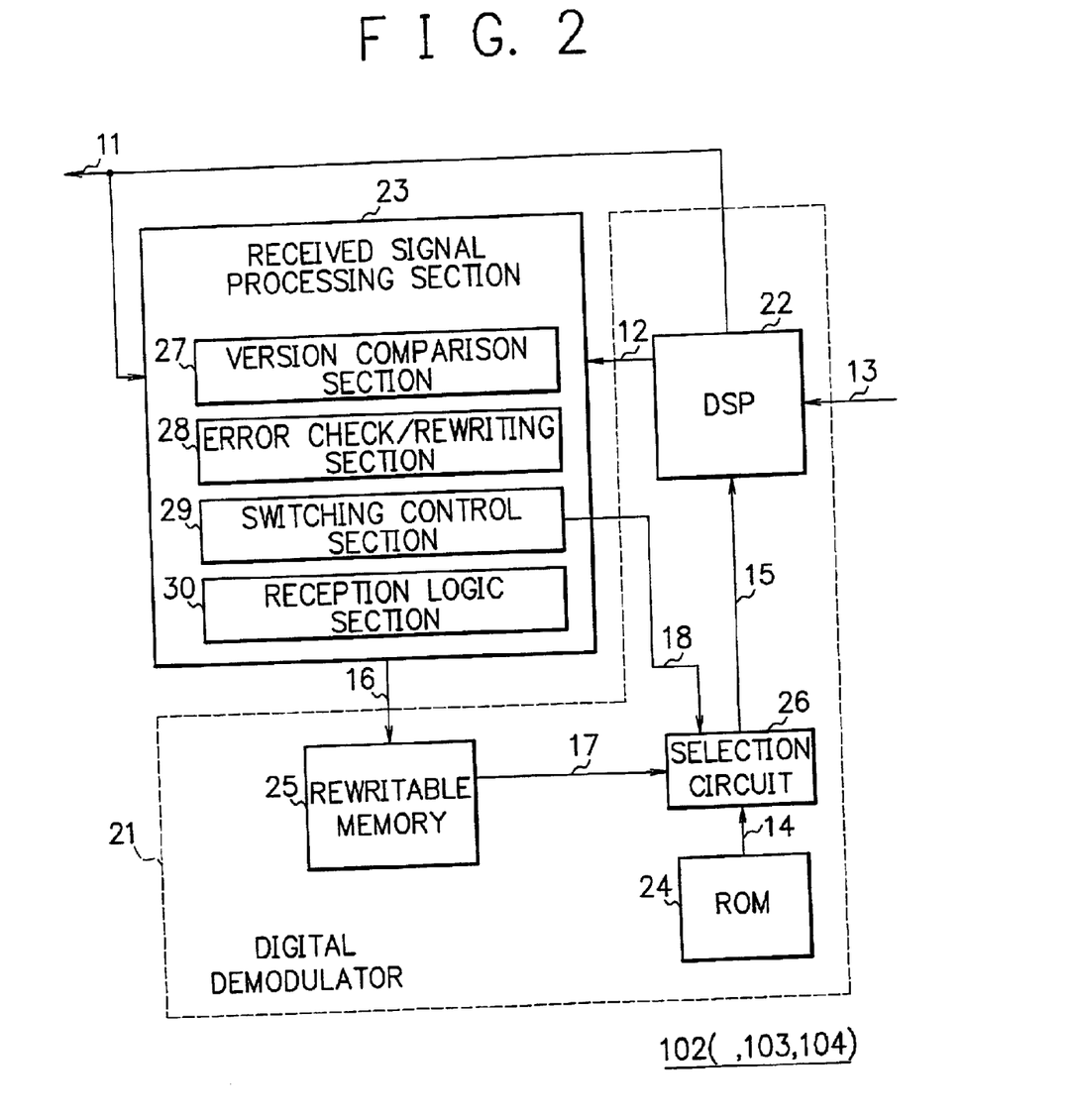
FIG. 2 is a block diagram showing an example of the composition of a VSAT (Very Small Aperture Terminal) which is employed in the digital satellite communications system of FIG. 1.

FIG. 2 is a block diagram showing an example of the composition of the VSAT (102, 103, 104) which is employed in the digital satellite communications system of the embodiment of the present invention. As shown in FIG. 2, each VSAT (102, 103, 104) includes a digital demodulator 21 and a received signal processing section 23. The digital demodulator 21 includes the aforementioned DSP 22. The DSP 22 as a demodulator conducts digital signal processing to the received signal 13 and thereby obtains demodulated data 11. The operation of the DSP 22 is determined by a DSP program 15 which is inputted and loaded into the DSP 22.

There are two types of DSP program 15: a default program 14 which is loaded from ROM 24 and an operation program 17 which is loaded from rewritable memory 25. In the example of FIG. 2, the digital demodulator 21 includes the ROM 24 (nonvolatile memory) for storing the default program 14 and the rewritable memory 25 for storing the operation program 17. The default program 14 is used by the DSP 22 as the aforementioned DSP program 15 for demodulating the received signal 13 which is transmitted from the HUB station 101 via the CSC outbound channel 105 when the VSAT is started up.

The rewritable memory 25 is implemented by flash memory, for example. To the rewritable memory 25, a DSP up-to-date program 113 which is supplied (downloaded) from the HUB station 101 via the CSC outbound channel 105 is inputted and the DSP up-to-date program 113 is stored as the operation program 17. The operation program 17 stored in the rewritable memory 25 is used by the DSP 22 as the aforementioned DSP program 15 when the VSAT receives data from another VSAT via the traffic channel 106.

The digital demodulator 21 is provided with the ROM 24 and the rewritable memory 25 for its exclusive use in the example of FIG. 2 as mentioned above, thereby the digital demodulator 21 is allowed to operate at high processing speed. The digital demodulator 21 is also provided with a selection circuit 26 which is connected to the ROM 24 and the rewritable memory 25. The selection circuit 26 makes a selection from the default program 14 of the ROM 24 and the operation program 17 of the rewritable memory 25, and the selected program is supplied to the DSP 22 as the DSP program 15.

When the VSAT is started up, the default program 14 is used by the DSP 22 as the DSP program 15 for the following reason. The operation program 17 is obtained by downloading the DSP up-to-date program 113 from the HUB station 101 via the communications satellite repeater 107, as mentioned before. The DSP up-to-date program 113 which is transmitted from the HUB station 101 to the VSAT is generally protected (by means of error correction, retransmission control, etc.) in order to cope with data transmission error occurring in the satellite channel. However, if an error accidentally remained in the downloaded DSP up-to-date program 113 due to hardware failure etc., the signal demodulation by the DSP 22 by use of the operation program 17 (DSP up-to-date program 113) might become impossible.

In such cases, the VSAT (102, 103, 104) can not be restored until a correct program is downloaded and loaded into the DSP 22 manually. Therefore, from the viewpoint of fail safe, the initial CSC reception is carried out by use of the default program 14 which guarantees correct CSC reception operation.

The received signal processing section 23 of the VSAT includes a version comparison section 27, an error check/rewriting section 28, a switching control section 29 and a reception logic section 30.

The version comparison section 27 receives version data 12 from the DSP 22 as part of the demodulated data 11 which is obtained by demodulating the signal 13 received from the HUB station 101 via the CSC outbound channel 105, compares a version (version number) which is read from the version data 12 (indicating the newest version of a DSP up-to-date program 113 that can be downloaded from the HUB station 101) with the version (version number) of the operation program 17 which has been stored in the rewritable memory 25 and which has been used by the DSP 22 as the DSP program 15. If the versions of the programs did not match, a request for the download (transmission, broadcast) of the DSP up-to-date program 113 is sent to the HUB station 101 via a CSC inbound channel and thereby the download of the DSP up-to-date program 113 is executed.

Subsequently, the error check/rewriting section 28 conducts error check to the DSP up-to-date program 113 obtained by the download by means of check sum etc. If error is found, the download of the DSP up-to-date program 113 is executed again. When an errorless DSP up-to-date program 16 (113) is obtained, the error check/rewriting section 28 overwrites the rewritable memory 25 with the errorless DSP up-to-date program 16 (113).

The switching control section 29 controls selection which is made by the selection circuit 26 by sending a switching control signal 18 to the selection circuit 26. When communication between the HUB station 101 and the VSAT via the CSC outbound channel 105 is executed, the switching control section 29 sends a switching control signal 18 for letting the selection circuit 26 select the ROM 24 so that the default program 14 stored in the ROM 24 will be loaded into the DSP 22 as the DSP program 15. When communication between VSATs via the traffic channel 106 is executed, the switching control section 29 sends a switching control signal 18 for letting the selection circuit 26 select the rewritable memory 25 so that the operation program 17 (DSP up-to-date program 113) stored in the rewritable memory 25 will be loaded into the DSP 22 as the DSP program 15.

In cases where no operation program 17 has been stored in the rewritable memory 25 yet, the switching control section 29 lets the selection circuit 26 select the ROM 24 so that the default program 14 stored in the ROM 24 will be loaded into the DSP 22 as the DSP program 15. In such cases, a DSP up-to-date program 113 is downloaded from the HUB station 101 using the default program 14 as the DSP program 15 of the DSP 22, and the downloaded DSP up-to-date program 113 is stored in the rewritable memory 25 as the operation program 17.

When CSC reception synchronization (demodulator synchronization, frame synchronization of demodulated data) is established and thereafter data reception is started, the reception logic section 30 detects the CSC reception. The reception logic section 30 informs the switching control section 29 about the detection, thereby the switching control section 29 outputs a switching control signal 18 so that the DSP program 15 of the DSP 22 will be switched from the default program 14 into the operation program 17 (DSP up-to-date program 113).

Figure 3:
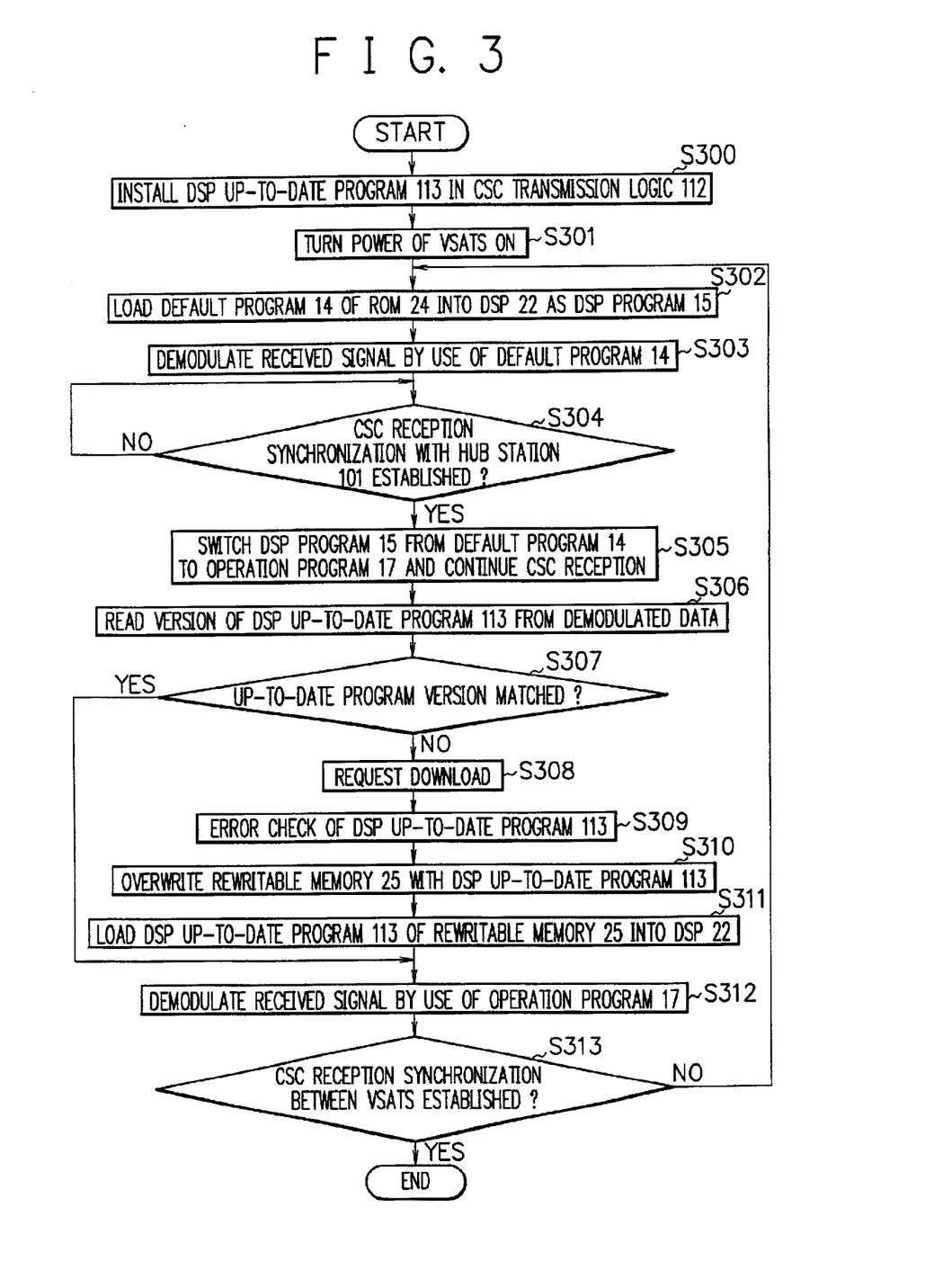
FIG. 3 is a flow chart showing an example of the operation of the digital satellite communications system of FIG. 1.

FIG. 3 is a flow chart showing an example of the operation of the digital satellite communications system of FIG. 1.

In step S300, as preparation for the control of the digital demodulators 21 of the VSATs 102, 103 and 104, the DSP up-to-date program 113 is installed in the CSC transmission logic 112 of the HUB station 101 so that the DSP up-to-date program 113 which should be used by the VSATs 102, 103 and 104 can be transmitted to the VSATs by superposing upon the CSC outbound channels 105.

In step S301, the VSATs 102, 103 and 104 are started up (power is turned on).

In step S302, in each VSAT (102, 103, 104) after the power-on, the selection circuit 26 is controlled by the switching control section 29 so as to select the default program 14 in the ROM 24 as the DSP program 15. Therefore, when the VSAT (102, 103, 104) is started up, not the operation program 17 in the rewritable memory 25 but the default program 14 in the ROM 24 is necessarily loaded into the DSP 22 of the digital demodulator 21 as the DSP program 15.

In step S303, the DSP 22 of each VSAT (102, 103, 104) demodulates the received signal 13 by use of the default program 14.

In step S304, after the signal demodulation could be done, the reception logic section 30 judges whether or not CSC reception synchronization with the HUB station 101 has been established. If the reception synchronization has not been established, the judgment of the step S304 is repeated until the reception synchronization is established. The reception logic section 30 also keeps track of reception mode, that is, whether signal reception which is currently carried out is CSC reception via the CSC outbound channel 105 (between the HUB station 101 and the VSAT) or traffic channel reception via the traffic channel 106 (between VSATs). In this case, the reception logic section 30 recognizes that the reception mode is CSC reception.

If the CSC reception synchronization has been established ("YES" in the step S304), the DSP program 15 is switched from the default program 14 to the operation program 17, and the CSC reception is continued (step S305).

In step S306, the version comparison section 27 reads the version (version number) of the DSP up-to-date program 113 from the version data 12 included in the demodulated data 11.

In step S307, the version comparison section 27 compares the version read from the version data 12 with the version of the operation program 17 which has been stored in the rewritable memory 25. If the versions of the programs matched ("YES" in the step S307), the process proceeds to step S312.

If the versions of the programs did not match ("NO" in the step S307), a request for the download (transmission, broadcast) of the DSP up-to-date program 113 is sent to the HUB station 101 (step S308).

In step S309, the error check/rewriting section 28 conducts error check (by checksum, for example) to the DSP up-to-date program 113 which has been obtained by the download from the HUB station 101. If an error has occurred to the DSP up-to-date program 113, the request for the download (transmission, broadcast) of the DSP up-to-date program 113 is sent again to the HUB station 101 by the error check/rewriting section 28.

In step S310, the rewritable memory 25 is overwritten with the downloaded errorless DSP up-to-date program 16 (113), thereby the errorless DSP up-to-date program 16 (113) is stored in the rewritable memory 25 and used as the operation program 17 (DSP program 15) of the DSP 22.

Incidentally, while the errorless DSP up-to-date program 16 (113) is stored in the rewritable memory 25 and used as the operation program 17 in this case, there is a case where no operation program 17 has been stored in the rewritable memory 25 at first. In such a case, the download of the DSP up-to-date program 113 is executed while letting the DSP 22 use the default program 14. After the download is completed, the DSP up-to-date program 113 is stored in the rewritable memory 25. Thereafter, the switching control section 29 outputs a switching control signal 18 so that the DSP program 15 of the DSP 22 will be switched from the default program 14 into the operation program 17 (DSP up-to-date program 113).

In step S311, the operation program 17 (DSP up-to-date program 113) is loaded from the rewritable memory 25 into the DSP 22 as the DSP program 15.

In step S312, the DSP 22 is controlled by the operation program 17 and thereby the demodulation of the received signal 13 is carried out.

When a call (a request for establishing a satellite link between VSATs) by a VSAT occurred and another VSAT receives signals via a traffic channel 106, after the assignment of the traffic channel 106, the digital demodulator 21 of the receiving VSAT tunes its reception frequency to the assigned channel, starts signal reception between VSATs, demodulates the received signal 13, and outputs demodulated data 11.

On the switching of the DSP up-to-date program 113 (operation program 17) into the newest version, demodulation by the DSP 22 is interrupted for a while, however, no system failure is caused. By the above update of the DSP up-to-date program 113 into the newest version, signal demodulation by use of the newest DSP up-to-date program 113 in the communication between VSATs is made possible.

In step S313, whether reception synchronization between VSATs has been established or not is judged. If the reception synchronization has been established ("YES" in the step S313), the process of FIG. 3 is ended. If the reception synchronization has not been established ("NO" in the step S313), the process is returned to the step S302.

The aim of the system is to communicate data by use of the traffic channels between VSATs, therefore, it is very important that the newest and optimized DSP up-to-date program 113 can constantly be used by the VSATs 102, 103 and 104 for the communication via the traffic channels. Therefore, after a call is over, reception via the CSC outbound channel 105 is started again by use of the operation program 17 and thereby the version (version number) of the newest DSP up-to-date program 113 that can be downloaded from the HUB station 101 is checked regularly. If the version of the newest DSP up-to-date program 113 differs from the version of the operation program 17, the request for download is sent to the HUB station 101. If reception synchronization can not be established by the currently used operation program 17, a request for the download of the DSP up-to-date program 113 can be made to the HUB station 101.

As described above, in the digital satellite communications system of the embodiment of the present invention, error check is conducted to a newly downloaded up-to-date program and if error is found in the error check, the up-to-date program is downloaded again. When an errorless up-to-date program is obtained, the errorless up-to-date program is stored in the rewritable memory 25. Therefore, communication between VSATs by use of the errorless up-to-date program is made possible without the need of ROM replacement. Even if the downloaded up-to-date program had abnormality, restart of the VSAT is unnecessary. In other words, only by the installation of the DSP up-to-date program 113 at the HUB station 101 for the update, the DSP up-to-date program 113 of the newest version is downloaded (broadcasted) to the VSATs 102, 103 and 104 at once. Even if a VSAT detected error in the downloaded DSP up-to-date program 113, the VSAT can obtain the DSP up-to-date program 113 again by requesting the download, without the need of starting up the VSAT again.

Figure 4:
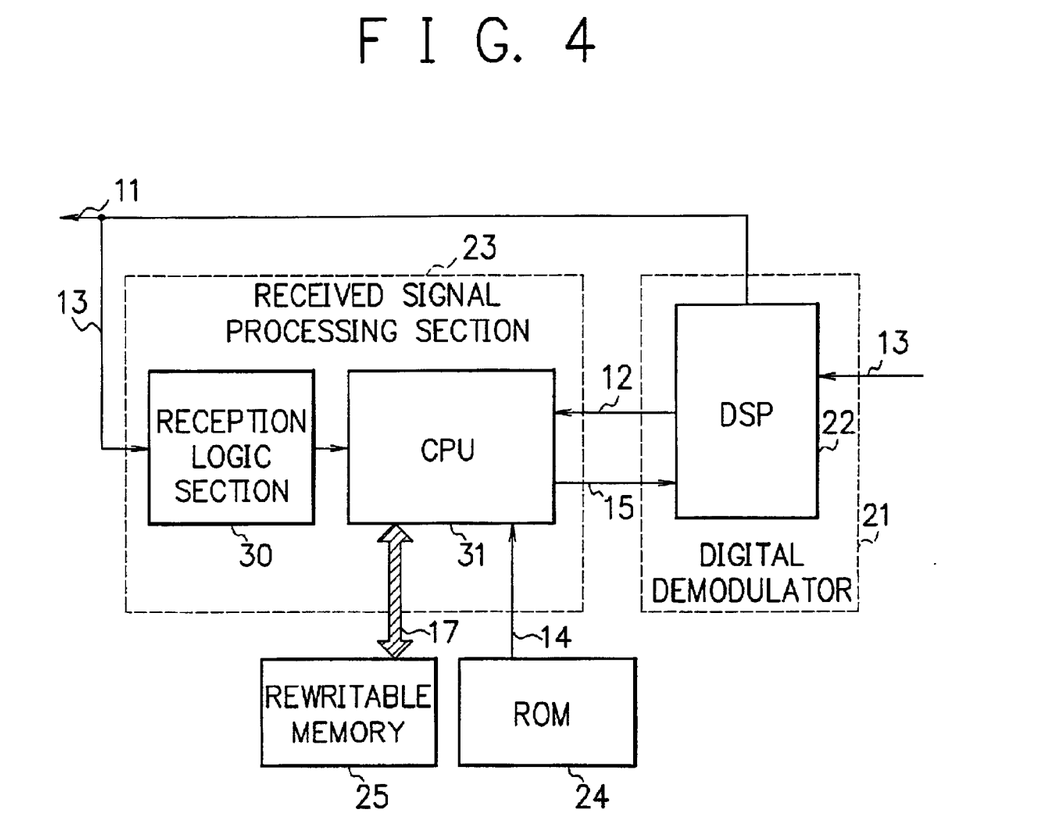
FIG. 4 is a block diagram showing another example of the composition of the VSAT which is employed in the digital satellite communications system of FIG. 1.

FIG. 4 is a block diagram showing another example of the composition of the VSAT (102, 103, 104) which is employed in the digital satellite communications system of the embodiment of the present invention. In the second example of FIG. 4, the digital demodulator 21 is provided with the DSP 22 only. ROM 24 and rewritable memory 25 are provided outside the digital demodulator 21. The ROM 24 and rewritable memory 25 in the second example are not for the exclusive use of the digital demodulator 21 but are shared by the digital demodulator 21 and other parts of the VSAT. In other words, ROM and rewritable memory for other parts are also used for the digital demodulator 21, thereby the composition of the VSAT is simplified in comparison with the first example.

The received signal processing section 23 in the second example is further provided with a CPU (Central Processing Unit) 31 which is connected with the ROM 24 and the rewritable memory 25. The selection which was executed by the selection circuit 26 in the first example of FIG. 2 is carried out by the CPU 31 in the second example. The operations which were executed by the version comparison section 27, the error check/rewriting section 28 and the switching control section 29 in the first example are also executed by the CPU 31 of the second example as will be explained below. The composition of the VSAT is simplified by the employment of the CPU 31.

The CPU 31 of the received signal processing section 23 loads the default program 14 or the operation program 17 into the DSP 22 of the digital demodulator 21 as the DSP program 15 in order to define the operation of the DSP 22. The DSP program 15 that is loaded into the DSP 22 just after start-up (power-on) of the VSATs 102, 103 and 104 is the default program 14 which has preliminarily been stored in the ROM 24.

When CSC reception synchronization of the demodulated data 11 which is obtained by use of the default program 14 is established and data reception is started, the reception logic section 30 detects the start of the data reception and informs the CPU 31 of the detection.

The CPU 31 reads the version (version number) of the DSP up-to-date program 113 from the received signal 13 which is supplied via the CSC outbound channel 105 and the reception logic section 30, and compares the version with the version of the operation program 17 which is currently used. If the versions of the programs did not match, a request for the download (transmission, broadcast) of the DSP up-to-date program 113 is sent to the HUB station 101 via a CSC inbound channel.

The CPU 31 executes error check (by checksum, for example) of the DSP up-to-date program 113 obtained by the download from the HUB station 101. If an error has occurred to the DSP up-to-date program 113, the request for the download (transmission, broadcast) of the DSP up-to-date program 113 is sent again to the HUB station 101 by the CPU 31. After an errorless DSP up-to-date program 16 (113) is obtained, the errorless DSP up-to-date program 16 (113) is stored in the rewritable memory 25.

When communication between VSATs is carried out, the CPU 31 reads the operation program 17 (DSP up-to-date program 113) from the rewritable memory 25 and loads the operation program 17 into the DSP 22 of the digital demodulator 21, thereby the DSP program 15 of the DSP 22 is switched from the default program 14 to the operation program 17.

Incidentally, while an explanation has been given above on the change of the programs of the DSP 22 of the digital demodulator 21, the present invention can also be used for the change of other programs for other types of updates or upgrades (such as alternation of the rate of a clock regenerator, change of configuration/arrangement of the digital satellite communications system, addition of functions of the digital satellite communications system, etc.). Such updates or upgrades can be attained without the replacement of ROM and even if an error occurred in the program download, similarly to the above explanation, thereby communication between VSATs is made possible by use of the downloaded new program.

As set forth hereinabove, in the digital satellite communications system and the digital satellite communications method in accordance with the present invention, error check is conducted to a newly downloaded up-to-date program and if error is found in the error check, the up-to-date program is downloaded again. When an errorless up-to-date program is obtained, the errorless up-to-date program is stored in rewritable memory. Therefore, communication between VSATs by use of the errorless up-to-date program is made possible without the need of ROM replacement. Even if the downloaded up-to-date program had abnormality, the VSAT is allowed to obtain the up-to-date program again by requesting the download of the up-to-date program, without the need of starting up the VSAT again.

The characteristics and performance of the communication channels can be improved quickly and easily by the download and update of the operation program of the demodulator as the "engine" for carrying out communication, thereby the quality of the "download" itself can be improved immediately and directly.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital satellite communications system for communicating data between a HUB station and a plurality of VSATs (Very Small Aperture Terminals) or between the VSATs via a communications satellite, wherein each VSAT comprises:

a digital signal processing means for demodulating signals which are received by the VSAT;

nonvolatile memory for storing a default program for letting the digital signal processing means execute signal demodulation at start-up of the VSAT;

rewritable memory for storing an operation program for letting the digital signal processing means execute signal demodulation after the start-up of the VSAT;

an operation program download means for obtaining the operation program by downloading the operation program from the HUB station;

an error check/rewriting means for conducting error check to the operation program downloaded from the HUB station until an errorless operation program is obtained by the download and storing the errorless operation program in the rewritable memory; and a switching control means for switching a program which is loaded into and used by the digital signal processing means from the default program to the operation program;

wherein the switching control means switches the program which is loaded into and used by the digital signal processing means from the operation program to the default program when reception synchronization between VSATs cannot be established.

2. A digital satellite communications system as claimed in claim 1, wherein: the VSAT further comprises a reception logic means for detecting data reception from the HUB station at the start-up of the VSAT based on demodulating operation of the digital signal processing means, and the switching control means executes the switching of the program from the default program to the operation program when the reception logic means detected the data reception from the HUB station.

3. A digital satellite communications system for communicating data between a HUB station and a plurality of VSATs (Very Small Aperture Terminals) or between the VSATs via a communications satellite, wherein each VSAT comprises:

a digital signal processing means for demodulating signals which are received by the VSAT;

nonvolatile memory for storing a default program for letting the digital signal processing means execute signal demodulation at start-up of the VSAT;

rewritable memory for storing an operation program for letting the digital signal processing means execute signal demodulation after the start-up of the VSAT;

an operation program download means for obtaining the operation program by downloading the operation program from the HUB station;

an error check/rewriting means for conducting error check to the operation program downloaded from the HUB station until an errorless operation program is obtained by the download and storing the errorless operation program in the rewritable memory; and a switching control means for switching a program which is loaded into and used by the digital signal processing means from the default program to the operation program;

wherein the VSAT further includes a version comparison means for comparing the version of an up-to-date operation program that can be downloaded from the HUB station with the version of the operation program which has been stored in the rewritable memory and making a request to the HUB station for the download of the up-to-date operation program so that the operation program will be replaced with the up-to-date operation program if the versions of the programs do not match; and wherein the version comparison means regularly conducts the version comparison between calls with other VSATs by referring to version data which is included in demodulated data which is obtained by demodulating signals transmitted from the HUB station.

4. A digital satellite communications system as claimed in claim 3, wherein the version comparison means is implemented by a CPU (Central Processing Unit).

5. A digital satellite communications system for communicating data between a HUB station and a plurality of VSATs (Very Small Aperture Terminals) or between the VSATs via a communications satellite, wherein each VSAT comprises:

a digital signal processing means for demodulating signals which are received by the VSAT;

nonvolatile memory for storing a default program for letting the digital signal processing means execute signal demodulation at start-up of the VSAT;

rewritable memory for storing an operation program for letting the digital signal processing means execute signal demodulation after the start-up of the VSAT;

an operation program download means for obtaining the operation program by downloading the operation program from the HUB station;

an error check/rewriting means for conducting error check to the operation program downloaded from the HUB station until an errorless operation program is obtained by the download and storing the errorless operation program in the rewritable memory; and a switching control means for switching a program which is loaded into and used by the digital signal processing means from the default program to the operation program;

wherein the operation program download means downloads the operation program from the HUB station via a CSC (Common Signaling Channel) outbound channel between the HUB station and the VSAT.

6. A digital satellite communications system as claimed in claim 1, wherein the digital signal processing means is implemented by a digital demodulator.

7. A digital satellite communications system as claimed in claim 6, wherein the digital signal processing means is implemented by a DSP (Digital Signal Processor).

8. A digital satellite communications system as claimed in claim 1, wherein the digital signal processing means is implemented by a digital demodulator having a clock regenerator.

9. A digital satellite communications system for communicating data between a HUB station and a plurality of VSATs (Very Small Aperture Terminals) or between the VSATs via a communications satellite, wherein each VSAT comprises:

a digital signal processing means for demodulating signals which are received by the VSAT;

nonvolatile memory for storing a default program for letting the digital signal processing means execute signal demodulation at start-up of the VSAT;

rewritable memory for storing an operation program for letting the digital signal processing means execute signal demodulation after the start-up of the VSAT;

an operation program download means for obtaining the operation program by downloading the operation program from the HUB station;

an error check/rewriting means for conducting error check to the operation program downloaded from the HUB station until an errorless operation program is obtained by the download and storing the errorless operation program in the rewritable memory; and a switching control means for switching a program which is loaded into and used by the digital signal processing means from the default program to the operation program;

wherein the nonvolatile memory and the rewritable memory are provided to the VSAT for the exclusive use of the digital signal processing means.

10. A digital satellite communications system for communicating data between a HUB station and a plurality of VSATs (Very Small Aperture Terminals) or between the VSATs via a communications satellite, wherein each VSAT comprises:

a digital signal processing means for demodulating signals which are received by the VSAT;

nonvolatile memory for storing a default program for letting the digital signal processing means execute signal demodulation at start-up of the VSAT;

rewritable memory for storing an operation program for letting the digital signal processing means execute signal demodulation after the start-up of the VSAT;

an operation program download means for obtaining the operation program by downloading the operation program from the HUB station;

an error check/rewriting means for conducting error check to the operation program downloaded from the HUB station until an errorless operation program is obtained by the download and storing the errorless operation program in the rewritable memory; and     a switching control means for switching a program which is loaded into and used by the digital signal processing means from the default program to the operation program;

wherein the nonvolatile memory and the rewritable memory are shared by the digital signal processing means and other parts of the VSAT.

11. A digital satellite communications system as claimed in claim 1, wherein the error check/rewriting means is implemented by a CPU (Central Processing Unit).

12. A digital satellite communications method for communicating data between a HUB station and a plurality of VSATs (Very Small Aperture Terminals) or between the VSATs via a communications satellite, comprising the steps of a default program storage step in which a default program for letting a digital signal processing means of the VSAT execute signal demodulation at start-up of the VSAT is stored in nonvolatile memory of the VSAT;

an initial signal reception step in which the VSAT receives signals from the HUB station and the digital signal processing means of the VSAT demodulates the received signals by use of the default program loaded from the nonvolatile memory at the start-up of the VSAT;

an operation program download step in which an operation program for letting the digital signal processing means execute signal demodulation after the start-up of the VSAT is downloaded from the HUB station to the VSAT;

an error check/rewriting step in which error check is conducted to the operation program downloaded from the HUB station until an errorless operation program is obtained by the download and the errorless operation program is stored in rewritable memory of the VSAT; and     a switching control step in which a program which is loaded into and used by the digital signal processing means is switched from the default program to the operation program;

further comprising a second switching control step in which the program which is loaded into and used by the digital signal processing means is switched from the operation program to the default program when reception synchronization between VSATs can not be established.

13. A digital satellite communications method as claimed in claim 12, wherein the switching of the program from the default program to the operation program is executed when data reception from the HUB station is detected based on demodulating operation of the digital signal processing means at the start-up of the VSAT.

14. A digital satellite communications method for communicating data between a HUB station and a plurality of VSATs (Very Small Aperture Terminals) or between the VSATs via a communications satellite, comprising the steps of a default program storage step in which a default program for letting a digital signal processing means of the VSAT execute signal demodulation at start-up of the VSAT is stored in nonvolatile memory of the VSAT;

an initial signal reception step in which the VSAT receives signals from the HUB station and the digital signal processing means of the VSAT demodulates the received signals by use of the default program loaded from the nonvolatile memory at the start-up of the VSAT;

an operation program download step in which an operation program for letting the digital signal processing means execute signal demodulation after the start-up of the VSAT is downloaded from the HUB station to the VSAT;

an error check/rewriting step in which error check is conducted to the operation program downloaded from the HUB station until an errorless operation program is obtained by the download and the errorless operation program is stored in rewritable memory of the VSAT;

a switching control step in which a program which is loaded into and used by the digital signal processing means is switched from the default program to the operation program; and     a second switching control step in which the program which is loaded into and used by the digital signal processing means is switched from the operation program to the default program when reception synchronization between VSATs can not be established;

wherein the version comparison step is regularly conducted between calls with other VSATs by referring to version data which is included in demodulated data which is obtained by demodulating signals transmitted from the HUB station.

15. A digital satellite communications method for communicating data between a HUB station and a plurality of VSATs (Very Small Aperture Terminals) or between the VSATs via a communications satellite, comprising the steps of a default program storage step in which a default program for letting a digital signal processing means of the VSAT execute signal demodulation at start-up of the VSAT is stored in nonvolatile memory of the VSAT;

an initial signal reception step in which the VSAT receives signals from the HUB station and the digital signal processing means of the VSAT demodulates the received signals by use of the default program loaded from the nonvolatile memory at the start-up of the VSAT;

an operation program download step in which an operation program for letting the digital signal processing means execute signal demodulation after the start-up of the VSAT is downloaded from the Hub station to the VSAT;

an error check/rewriting step in which error check is conducted to the operation program downloaded from the HUB station until an errorless operation program is obtained by the download and the errorless operation program is stored in rewritable memory of the VSAT; and a switching control step in which a program which is loaded into and used by the digital signal processing means is switched from the default program to the operation program;

wherein in the operation program download step: the download of the operation program is executed via a CSC (Common Signaling Channel) outbound channel between the HUB station and the VSAT.

* * * * *